Patented Oct. 20, 1942

2,299,287

UNITED STATES PATENT OFFICE 2,299,287

SUGAR COMPOSITION

Robert Whymper, New York, N. Y., assignor to The National Sugar Refining Company, Edgewater, N. J., a corporation of New Jersey No Drawing. Application December 21, 1939, Serial No. 310,329

7 Claims. (Cl. 127—30)

The object of this invention is to simplify the preparation of fondant, cake-icings and the like sugar fabrications. The customary practice in making fondant, for example, is by dissolving sucrose crystals in water, cooking and graining the sucrose syrup so formed, to which other forms of sugar or cutting agents have been generally added, and is a process requiring exact conditions and careful supervision besides the use of heat and special machinery, the purpose being to secure a product which is soft, perfectly smooth on the tongue and adapted to preserve a certain quality of moistness and smoothness for the longest possible time; as will be understood, a good quality fondant should be of such fine texture as not to produce the sensation of grittiness on the teeth. By the present invention, this result can be obtained quickly and easily by the simple process of mixing the requisite amount of water with a previously prepared composition, which latter represents the substance of the present invention and one example of which can be made as follows.

A mass of sucrose in finely divided form, and which must be at least fine enough to pass wholly through a Tyler screen of 250 mesh or preferably 300 mesh, is placed in a mixing machine or other suitable apparatus which is sufficiently enclosed to avoid too much escape in the form of dust. Into this powdered sucrose there is then injected and mixed, preferably in the form of a fine spray, a portion of liquid, partially or wholly inverted sugar, or inverted sugar solution. The relative quantities of sucrose and invert in the finished product should be in the proportion of not less than 70% sucrose nor more than 30% invert, and the partially or wholly inverted sugar, if in solution, preferably should not contain more than 20% water at the utmost.

The injection of the invert is done while the mixing is in progress, and the mixing is continued until the invert first appears to have been entirely absorbed and the mixture appears to the eye but little changed from the original powdered sugar. Continuation of the mixing to any substantial extent beyond this point tends to defeat the purpose of the invention. The effect of mixing to the extent indicated is to surround each of the fine globules or particles of sprayed invert with a covering or envelopment by the very fine sucrose particles adherent thereto to such extent that the stickiness of the invert is no longer manifest and the mixture is a non-sticky and substantially free-flowing and non-caking powder under all normal conditions. Though not necessary, the product may be dried to insure maximum freedom from moisture when packaged.

Properly compounded as above described, this powder, on being mixed with a correct proportion of water, even cold water, produces a fondant of excellent properties; equivalent in all respects to that made by the ordinary and more complicated cooking and graining process such as above referred to, and useful for cake-icings, fudge-making, and many other confectionery and baking purposes and more economical of production than other fondant powders heretofore proposed. It may be stored in suitable packages for long periods of time without objectionable solidification or caking. It will be found to be composed in part of loose or free crystalline sucrose particles and in part of small aggregates of crystalline sucrose particles held together by invert intervening between them. No invert exists on the exterior of these aggregates so that they cannot therefore stick to each other and thereby promote solidification and any of them which break apart as by the effect of some mechanical action, and so as to expose invert, are immediately repaired, so to speak, by the adherence to any such exposed invert of some of the free crystalline sucrose particles always present in excess. In this way the mixture which is very similar in appearance to ordinary powdered sugar, preserves its non-sticky condition indefinitely under normal conditions, yet carries into the ultimate product all those properties of smoothness and moistness which fondants are required to exhibit. The size of the agglomerates may vary from an assemblage of but several crystals up to larger groups approximating granules of size 10 on the Tyler scale, although the smaller sizes are preferred because of their quicker breaking down in cold water. Size control may be effected by control of the invert spray and the speed of the mixer.

To the extent that they do not disturb the physical structure and smoothness of the new composition, other ingredients, flavoring, coloring, or the like, may be incorporated and, instead of the finely powdered sucrose, anhydrous or hydrated dextrose or lactose might be substituted in whole or in part, provided such substances are first reduced to the range of fineness above indicated, which is below that producing a sensation of grittiness. Anhydrous dextrose, in suitable amount, is particularly satisfactory as an addition on account of its tendency to absorb moisture, when present, becoming thereby converted to the hydrated compound which, however, is still a dry powder in the mixture, thereby maintaining the non-caking quality even under damp conditions.

Likewise other normally non-crystallizing substances and called herein non-crystallizable sugar, like corn-syrup, levulose or maltose or mixtures of any of them could be substituted in whole or in part for the invert component.

I claim:

1. A sugar composition comprising a mixture of crystalline sugar particles, in a size range finer than 250 Tyler screen mesh and finely divided portions of normally non-crystallizable sugar, in the proportion of not under about 70% of the crystallizable or over about 30% of the non-crystallizable sugar, and in a form wherein the non-crystallizable portions are kept from sticking together by being wholly enveloped by or contained inside of agglomerates of said crystalline particles in the presence of others of said particles which are free or non-agglomerated, and the whole constituting a substantially non-sticky and free-flowing powder suitable for fondant-making.

2. A sugar composition comprising small spray particles of invert sugar, each completely enveloped by fine adhering crystalline particles of sucrose in a size range finer than 250 Tyler screen mesh thereby kept from sticking to each other, said enveloped particles being associated with other of such fine crystalline particles non-adherent thereto, the whole constituting a non-sticky and non-caking powder.

3. The method of making a non-sticky preparation of crystallizable and non-crystallizable sugars which comprises reducing sugar crystals to a size range finer than 250 Tyler screen mesh, injecting the non-crystallizable sugar into the fine crystalline sugar particles in the proportion of not more than 30% non-crystallizable to not more than 70% of the crystalline and mixing the two sugars to only such extent that the non-crystallizable sugar becomes wholly contained within small agglomerates of some of said fine crystalline sugar particles surrounded by the rest of said fine crystalline particles in free or non-agglomerate state.

4. A sugar composition comprising a non-sticky, free-flowing mixture of crystalline sugar particles in a size range finer than 300 Tyler screen mesh and finely divided portions of normally non-crystallizing sugar, in the proportion of not under 70% crystallizable or over 30% non-crystallizable, and in a form wherein some of the fine crystalline sugar particles are aggregated about and envelop the non-crystallizing portions so as to keep them from sticking together, and the rest are free crystalline particles.

5. The composition of claim 1 wherein the fine crystalline sugar particles include dextrose.

6. The composition of claim 1 wherein the fine crystalline sugar particles include lactose.

7. The composition of claim 1 wherein the fine crystalline sugar particles include sucrose.

ROBERT WHYMPER.